I. SCUDDER.
Bark Mill.
No. 4,237.
Patented Oct. 25, 1845.
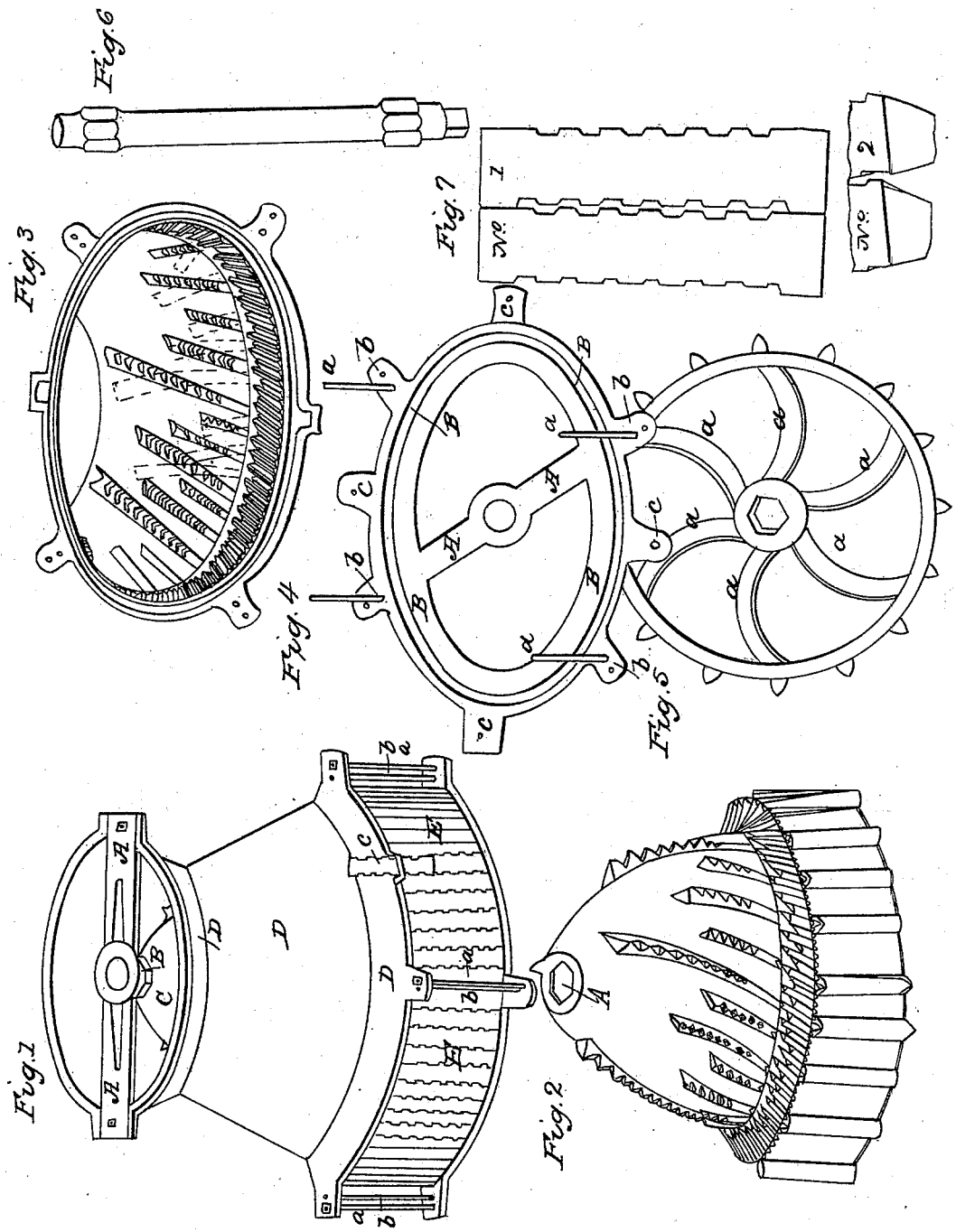

UNITED STATES PATENT OFFICE.

ISAIAH SCUDDER, OF PRATTSVILLE, NEW YORK, ASSIGNOR TO MILO J. WHITON, OF BROAD ALBIN, NEW YORK.

BARK-MILL.

Specification of Letters Patent No. 4,237, dated October 25, 1845; Antedated April 25, 1845.

*To all whom it may concern:*

Be it known that I, ISAIAH SCUDDER, of Prattsville, in the county of Green and State of New York, have invented a new and useful Improvement on Mills for Grinding Bark; and I do hereby declare that the following is a full, clear, and exact description of the construction and operation of the same, reference being had to the accompanying drawing, making a part of this specification, in which there are two parts, a nut and shell, with the necessary parts to connect and put them in motion.

Figure 1st is a perspective view of the mill. A, A, a cross bar which supports the top of the shaft and in which it turns. This bar is fastened by a screw-bolt at each end to the rim on the top of the shell. B, the shaft where it passes through the top of the nut and by which the nut is put in motion; this part of the shaft is a square of six sides to which the aperture in the nut is adapted. C, the top of the nut with the points of the teeth visible.
D, D, D, the shell which incloses the conical part of the nut. E, E, the lower or vertical part of the shell, composed of upright toothed bars, acting as a rasp on the bark already cut small and pressed against these bars by the arms or flanges in the lower part of the nut. The bark when thus ground sufficiently fine, passes out of the mill through the interstices between these bars. These bars are supported at each end and kept in their places by grooves in the plates which form the rim of the upper shell and the bottom of the mill. *a, a, a*, rods with a nut and screw by which the lower part of the machine is held together. *b, b, b*, standards fast at the lower ends to the bottom plate, but loose at the top so that when the screw-rods are loosed the upper shell can be raised a little to allow the bars to be slid in the grooves when necessary to place them properly. *c*, an aperture in the rim of the upper shell through which the bars are passed down into the grooves whence they can be slid around into their places. There are two of these apertures, one on each side of the machine.

Fig. 2, is the nut or revolving part of the machine. The teeth on the conical part of the nut are placed in rows of different lengths; those at the top of the longest rows are about $1\frac{1}{2}$ inches in height, and at the bottom $\frac{7}{8}$ of an inch, and the other rows of the same height in proportion to their length. The teeth on the beveled part are about $\frac{1}{2}$ inch in height, and the arms or flanges on the bottom are about $1\frac{1}{2}$ inches in height. The teeth on this nut are all set shearing in the direction in which the nut is to turn, which in this case is from left to right or against the sun.

Fig. 3, is the upper or conical part of the shell, showing the arrangement of the teeth, the groove for receiving the upper ends of the bars which form the lower part of the shell. The teeth in this shell are set shearing the opposite way or against the corresponding ones in the nut. The dotted lines represent the corresponding teeth in the nut, showing the direction in which they act against those on the shell. The long rows of teeth on the nut and shell should run within about $\frac{1}{4}$ of an inch of touching each other at the top of the rows, and about $\frac{1}{8}$ at the bottom. The teeth on the beveled part should run as near together as can be without striking.

Fig. 4, is the plate which forms the bottom of the machine. A, A, a cross bar through which the shaft passes and in which it revolves freely. B, B, B, B, the groove in which the lower end of the toothed bars are placed. *a, a, a, a*, the upright standards which pass through corresponding holes in the upper shell and keep it steady. *b, b, b, b*, holes in which the screw-rods are placed. *c, c, c, c*, holes through which bolts are passed to secure the machine to its place.

Fig. 5, is the bottom of the nut, *a, a, a, a, a, a*, the arms through the center of which the shaft passes. These arms are in a separate piece from the rest of the nut, and are let into it by gains or sockets.

Fig. 6, is the shaft.

Fig. 7, No. 1, two of the bars which form the vertical or lower part of the shell. This figure shows the inner face of the bars and the arrangement of the teeth. The interstices between the bars are about $\frac{1}{8}$ of an inch, and one edge of the bar with its teeth rises about $\frac{1}{8}$ of an inch higher than the other, thus presenting a series of edges like a plane or rasp by which the bark pressed against them by the flanges in the nut is cut fine enough to pass through. The flanges should run within about $\frac{1}{8}$ of an inch of these bars. The back or outside of these bars are beveled as shown at No. 2, narrower than the face, leaving the interstices flaring so that the ground bark may pass freely through without choking.

What I claim as my invention, and desire to secure by Letters Patent, is—

The lower part, or second mill, which receives the bark from the upper, and discharges it through the side or bottom of the mill, or both, by the aid of arms or flanges attached to the nut or shaft which force the bark through grater or double saw teeth, whichever are used.

ISAIAH SCUDDER.

Witnesses:
L. F. PARKER,
CHARLES F. CHAMBERS.